(12) United States Patent
Zhang

(10) Patent No.: US 10,827,198 B2
(45) Date of Patent: Nov. 3, 2020

(54) MOTION ESTIMATION METHOD, APPARATUS, AND STORAGE MEDIUM

(71) Applicant: TENCENT TECHNOLOGY (SHENZHEN) COMPANY LIMITED, Shenzhen (CN)

(72) Inventor: Hongshun Zhang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/656,116

(22) Filed: Oct. 17, 2019

(65) Prior Publication Data
US 2020/0053381 A1 Feb. 13, 2020

Related U.S. Application Data

(63) Continuation of application No. PCT/CN2018/103642, filed on Aug. 31, 2018.

(30) Foreign Application Priority Data

Sep. 28, 2017 (CN) .......................... 2017 1 0894492

(51) Int. Cl.
*H04N 19/52* (2014.01)
*H04N 19/523* (2014.01)
(Continued)

(52) U.S. Cl.
CPC ........... *H04N 19/52* (2014.11); *H04N 19/523* (2014.11); *H04N 19/56* (2014.11); *H04N 19/563* (2014.11); *H04N 19/567* (2014.11)

(58) Field of Classification Search
CPC ...... H04N 19/52; H04N 19/523; H04N 19/56; H04N 19/563; H04N 19/567; H04N 19/61
(Continued)

(56) References Cited

U.S. PATENT DOCUMENTS

2007/0002949 A1    1/2007  Cheung et al.
2014/0085415 A1*   3/2014  Bici ..................... H04N 19/597
                                                           348/43

(Continued)

FOREIGN PATENT DOCUMENTS

CN         104811728 A     7/2015
CN         106101709 A    11/2016
(Continued)

OTHER PUBLICATIONS

International Search Report Issued in application PCT/CN2018/103642 dated Oct. 24, 2018 with English Machine Translation, (6 pages).

(Continued)

*Primary Examiner* — Tung T Vo
(74) *Attorney, Agent, or Firm* — Oblon, McClelland, Maier & Neustadt, L.L.P.

(57) ABSTRACT

A motion estimation method and apparatus, and a non-transitory computer-readable storage medium are provided. In the method, for a predicting unit (PU) in a to-be-coded image, a candidate motion vector (MV) list for the PU is constructed based on advanced motion vector prediction (AMVP). A rate distortion (RD) cost value of each MV in the candidate MV list is calculated. A target MV of the AMVP corresponding to the smallest RD cost value of the AMVP is obtained. Integer motion estimation (IME) is performed on the PU based on a mapping point of the target MV of the AMVP in a reference frame. A target MV of the IME is obtained. The target MV of the IME is converted to quarter pixel precision, to obtain a reference target MV of quarter motion estimation (QME). Further, as a final result of a motion estimation process is determined.

17 Claims, 8 Drawing Sheets

(51) Int. Cl.
*H04N 19/56* (2014.01)
*H04N 19/563* (2014.01)
*H04N 19/567* (2014.01)

(58) Field of Classification Search
USPC ............................................. 375/240.16
See application file for complete search history.

(56) References Cited

U.S. PATENT DOCUMENTS

| | | | | |
|---|---|---|---|---|
| 2014/0301463 A1* | 10/2014 | Rusanovskyy | ........ | H04N 19/39 375/240.14 |
| 2015/0016531 A1* | 1/2015 | Hannuksela | ........... | H04N 19/46 375/240.16 |
| 2015/0078456 A1* | 3/2015 | Hannuksela | ........... | H04N 19/42 375/240.25 |
| 2015/0195562 A1* | 7/2015 | Li | ......................... | H04N 19/56 375/240.02 |
| 2015/0245063 A1* | 8/2015 | Rusanovskyy | ........ | H04N 19/30 375/240.12 |
| 2015/0264404 A1* | 9/2015 | Hannuksela | ........... | H04N 19/70 375/240.16 |
| 2015/0304665 A1* | 10/2015 | Hannuksela | ......... | H04N 13/161 375/240.02 |
| 2017/0238005 A1 | 8/2017 | Chien et al. | | |
| 2018/0091816 A1* | 3/2018 | Chien | .................... | H04N 19/70 |
| 2018/0098089 A1* | 4/2018 | Chen | .................... | H04N 19/521 |
| 2019/0208223 A1* | 7/2019 | Galpin | ................. | H04N 19/139 |
| 2019/0222858 A1* | 7/2019 | Embar Raghukrishnan | ................ | H04N 19/137 |
| 2019/0261018 A1* | 8/2019 | Bordes | ................... | H04N 19/31 |
| 2020/0029091 A1* | 1/2020 | Chien | ................. | H04N 19/139 |
| 2020/0137415 A1* | 4/2020 | Esenlik | ................. | H04N 19/55 |

FOREIGN PATENT DOCUMENTS

| | | |
|---|---|---|
| CN | 107087171 A | 8/2017 |
| WO | WO2017/142875 A1 | 8/2017 |

OTHER PUBLICATIONS

Written Opinion Issued in PCT/CN2018/103642 dated Oct. 24, 2018 with English Machine Translation (6 pages).

* cited by examiner

MOTION ESTIMATION METHOD, APPARATUS, AND STORAGE MEDIUM

RELATED APPLICATION

This application is a continuation of International Application No. PCT/CN2018/103642, filed on Aug. 31, 2018, which claims priority to Chinese Patent Application No. 201710894492.7, entitled "MOTION ESTIMATION METHOD AND APPARATUS, AND STORAGE MEDIUM" filed on Sep. 28, 2017. The entire disclosures of the prior applications are hereby incorporated by reference in their entirety.

FIELD OF THE TECHNOLOGY

The present disclosure relates to the field of Internet technologies, and in particular, to a motion estimation method, apparatus, and device, and a storage medium.

BACKGROUND OF THE DISCLOSURE

Motion estimation is the most important component of video coding and refers to a process of segmenting each frame of image into at least one macro-block not overlapping with each other and searching for a matching block most similar to each macro-block within a specified area of a reference frame according to a specified search algorithm. The motion estimation not only lowers complexity of a video coding process but also reduces a quantity of bits in a video transmission process. Therefore, the motion estimation is necessary in the video coding process.

In the related technology, when the motion estimation is performed, the following methods are mainly used: an advanced motion vector prediction (AMVP) method is used to establish a candidate motion vector (MV) list for a current predicting unit (PU) (the PU is a macro-block) by using correlation between a space-domain motion vector and a time-domain motion vector; a sum of absolute differences (SAD) method is used to calculate a rate distortion (RD) cost of each MV in a candidate MV list, to obtain at least one RD cost value; a smallest RD cost value is obtained from the at least one RD cost value, and a MV corresponding to the smallest RD cost value is used as a target MV of AMVP; integer motion estimation (IME) is performed by using a mapping point of the target MV of the AMVP in a reference frame as an initially selected point, and a target MV of the IME is obtained from a calculation result; half motion estimation (HME) is performed by using a mapping point of the target MV of the IME in the reference frame as an initially selected point, and a target MV of the HME is obtained from the calculation result; quarter motion estimation (QME) is performed by using a mapping point of the target MV of the HME in the reference frame as an initially selected point, and the target MV of the QME and a smallest RD cost value of the QME are obtained from the calculation result, and the target MV of the QME and the smallest RD cost value of the QME are determined as a final result of a motion estimation process.

However, calculation amounts of half motion estimation and quarter motion estimation are large, causing a long time of the motion estimation process and much resource consumption.

SUMMARY

To shorten duration of a motion estimation process and save resource consumption of the motion estimation process, embodiments of the present disclosure provide a motion estimation method, apparatus, device, and a non-transitory computer-readable storage medium. The technical solutions are as follows:

According to one aspect, a motion estimation method is provided. In the method, for a predicting unit (PU) in a to-be-coded image, a candidate motion vector (MV) list for the PU is constructed based on advanced motion vector prediction (AMVP), the candidate MV list including at least one MV of the PU. A rate distortion (RD) cost value of each MV in the candidate MV list is calculated. A target MV of the AMVP corresponding to the smallest RD cost value of the AMVP is obtained from a result of the calculation. Integer motion estimation (IME) is performed on the PU based on a mapping point of the target MV of the AMVP in a reference frame as an initially selected point. A target MV of the IME is obtained from the result of the calculation. The target MV of the IME is converted to quarter pixel precision, to obtain a reference target MV of quarter motion estimation (QME). The target MV of the AMVP and the smallest RD cost value of the AMVP are determined as a final result of a motion estimation process in a case that the target MV of the AMVP and the reference target MV of the QME are the same.

In one aspect, each target MV is a MV corresponding to a smallest RD cost value of each motion estimation.

In one aspect, when the target MV of the AMVP and the reference target MV of the QME are different, half motion estimation (HME) is performed based on a mapping point of the target MV of the IME in the reference frame as an initially selected point. A target MV of the HME is obtained from the result of the calculation. QME is performed based on a mapping point of the target MV of the HME in the reference frame as an initially selected point, to obtain a smallest RD cost value of the QME and a target MV of the QME. The final result of the motion estimation process is determined according to the smallest RD cost value of the AMVP, the smallest RD cost value of the QME, the target MV of the AMVP, and the target MV of the QME.

In one aspect, the target MV of the AMVP and the smallest RD cost value of the AMVP are determined as the final result of the motion estimation process in a case that the smallest RD cost value of the AMVP is less than the smallest RD cost value of the QME. The target MV of the QME and the smallest RD cost value of the QME are determined as the final result of the motion estimation process in a case that the smallest RD cost value of the AMVP is greater than the smallest RD cost value of the QME.

In one aspect, a space-domain candidate list and a time-domain candidate list are determined based on the AMVP, the space-domain candidate list including at least one space-domain motion vector of the PU, and the time-domain candidate list including at least one time-domain motion vector of the PU. A first preset quantity of space-domain motion vectors is selected from the space-domain candidate list. A second preset quantity of time-domain motion vectors is selected from the time-domain candidate list. A first motion prediction list is constructed according to the first preset quantity of space-domain motion vectors and the second preset quantity of time-domain motion vectors. Same motion vectors in the first motion prediction list are merged and filling is performed by using a zero motion vector, to obtain a second motion prediction list. A third preset quantity of motion vectors is selected from the second motion prediction list. The candidate MV list is constructed according to the third preset quantity of motion vectors.

In one aspect, the RD cost value of each MV in the candidate MV list is calculated based on a sum of absolute transformed difference (SATD), to obtain at least one RD cost value. The obtaining the target MV of the AMVP includes selecting the smallest RD cost value from the at least one RD cost value; and using the selected RD cost value as the smallest RD cost value of the AMVP and using the MV corresponding to the smallest RD cost value of the AMVP as the target MV of the AMVP.

In one aspect, a location of the mapping point of the target MV of the AMVP in the reference frame is corrected. Further, the performing the IME includes performing the IME based on the corrected location as the initially selected point.

According to another aspect, a motion estimation device is provided. The device includes a processor and a memory, the memory storing at least one instruction, at least one program, and a code set or an instruction set, and the at least one instruction, the at least one program, and the code set or the instruction set being loaded and executed by the processor to implement any of the motion estimation method.

According to some aspects, an information processing apparatus is provided that is configured to perform any of the motion estimation methods. In some embodiments, a non-transitory computer-readable medium is provided. The non-transitory computer-readable medium stores instructions which when executed by at least one processor (e.g., a central processing unit or a graphic processing unit) cause the at least one processor to perform any of the motion estimation methods The technical solutions provided in the embodiments of the present disclosure have the following beneficial effects:

The RD cost of each MV in the candidate MV list is calculated, the target MV of the AMVP is obtained, the IME is performed by using the mapping point of the target MV of the AMVP in the reference frame as the initially selected point, the reference target MV of the QME is obtained by amplifying the target MV of the IME to the quarter precision, and HME and the QME do not need to be performed but the target MV of the AMVP and the smallest RD cost value of the AMVP are directly used as the final result when the target MV of the AMVP and the reference target MV of the QME are the same, to reduce a calculation amount of calculation of the HME and the QME, shorten duration of a motion estimation process, and save resource consumption.

BRIEF DESCRIPTION OF THE DRAWINGS

To describe the technical solutions of the embodiments of the present disclosure more clearly, the following briefly introduces the accompanying drawings required for describing the embodiments of the present disclosure. The accompanying drawings in the following description show only some embodiments of the present disclosure, and a person of ordinary skill in the art may still derive other drawings from these accompanying drawings.

DESCRIPTION OF EMBODIMENTS

To make the objectives, technical solutions, and advantages of the embodiments of the present disclosure clearer, the following further describes embodiments of the present disclosure in detail with reference to the accompanying drawings.

With the development of various digital technologies such as an Internet technology and a digital communication technology, user's lifestyles and working modes gradually change. To meet requirements in fields such as home theaters, remote monitoring, digital broadcast, mobile streaming, portable camera shooting, and medical imaging, a high definition, a high compression rate, and a high frame rate become a development trend of video coding in the future. Because H.264 video coding technology has a certain limitation and cannot meet a requirement of future video coding, a high efficiency video coding (HEVC) video coding technology accordingly emerges.

The HEVC is also referred to as an H.265 video coding technology and has the following advantages compared with a conventional H.264 video coding technology:

(1) High compression rate: the compression rate is improved by 50%, which means that same picture quality requires only a half of bit rates.

(2) High frame rate: 35% of broadband loss is reduced for same picture quality in real-time coding.

(3) High definition: a larger video resolution ratio, including 2K, 4K, and the like, is supported.

(4) Low costs: standard-definition and high-definition video data may be transmitted on a low bit rate.

Figure 1:
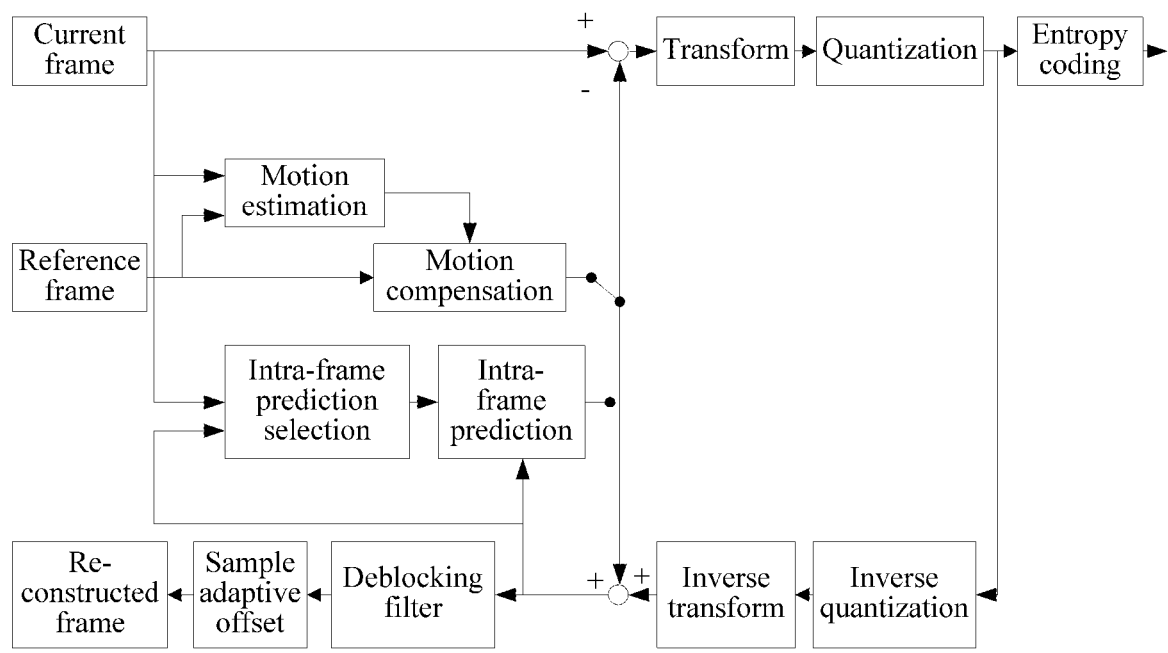
FIG. 1 is an HEVC coding framework diagram according to an embodiment of the present disclosure.

FIG. 1 shows an HEVC coding framework. Referring to FIG. 1, an HEVC coding process is as follows:

Step 1: For any frame of a to-be-coded image, the to-be-coded image is segmented into at least one PU not overlapping with each other.

Step 2: The to-be-coded image is input into a coder for coding and prediction. The process mainly uses space correlation and time correlation of video data and uses intra-frame prediction or inter-frame prediction to remove time and space domain redundancy information of each PU, to obtain a prediction image block of each PU in a reference frame.

Step 3: A difference between the prediction image block and an original PU is obtained, to obtain a prediction residual block, and discrete cosine transform (DCT) and quantization are performed on the prediction residual block, to obtain a quantized DCT coefficient.

DCT is a mathematical operation closely related to Fourier transform. In a Fourier series expansion formula, if an expanded function is a real even function, a Fourier series thereof only includes cosine items and is first discretized and then is subject to cosine transform when being processed. Quantization is a common technology in the field of digital signal processing and refers to a process of approximating consecutive values (or a large quantity of possible discrete values) of a signal as a limited plurality of (or few) discrete values. Quantization is mainly applied to conversion from consecutive signals to digital signals, the consecutive signals become discrete signals through sampling, and the discrete signals become digital signals through quantization.

Step 4: Entropy coding is performed on the DCT coefficient, to obtain and output a compression bit rate.

Step 5: Inverse quantization and inverse DCT are performed on the quantized DCT coefficient, to obtain a residual block of a re-constructed image, to add the residual block of the re-constructed image and an intra-frame or inter-frame prediction image block, to obtain the re-constructed image.

Step 6: After deblocking filter (DB) and sample adaptive offset (SAO) are performed on the re-constructed image, the re-constructed image is added to a reference frame queue and is used as a reference frame of a next frame of a to-be-coded image. A video image may be coded frame by frame by circularly performing step 1 to step 6.

A main function of the DB is to enhance a boundary of an image and reduce discontinuity of the boundary of the image. The sample adaptive offset is mainly used for performing local information compensation on the image processed through the DB, to reduce distortion between a source image and the re-constructed image.

Motion Estimation

Considering that object motion in real life is continuous, a difference between two consecutive frames of video images in one consecutive video sequence is small, and only the relative position of an object may change, or only the two frames of images change on a boundary. For a video coder, if each frame of video image in a video sequence is coded, bit-streams are greatly wasted. If coding is performed according to the difference between the two frames of images and a reference frame, waste of bit-streams can be greatly reduced.

A basic idea of motion estimation is segmenting each frame of an image sequence into many macro-blocks not overlapping with each other, setting displacements of all pixels in the macro-blocks to be the same, and then searching for each macro-block within a specified area of the reference frame according to a specified search algorithm and a specified matching rule, to find a matching block most similar to each macro-block. A relative displacement between the matching block and a target block (such as a current macro-block) is a motion vector. When a video is compressed, the target block may be recovered provided that the motion vector, a residual block, and the reference frame are stored. Inter-frame redundancy may be removed through motion estimation, so that a quantity of bits transmitted by the video is greatly reduced. The specified search algorithm includes, for example, a global search algorithm, a fractional precision search algorithm, a fast search algorithm, a hierarchical search algorithm, a hybrid search algorithm, and/or the like. The specified matching rule includes, for example, a mean absolute difference (MAD), a mean squared error (MSE), and/or the like.

When HEVC is used for video coding, because a requirement for segmentation precision of a to-be-coded image is finer, and segmentation directions are more, a calculation amount is larger in a coding process. If high compression performance is to be implemented, a coder needs to be optimized. It may be known according to experiment data that currently, calculation amounts of inter-frame prediction and coding parts are large and approximately take up 90% of calculation amounts of a whole video coding process; calculation amounts of intra-frame prediction and coding parts are small and approximately take up 8% of calculation amounts of the whole video coding process; calculation amounts of deblocking filter and sample adaptive offset parts are the smallest and approximately take up 1% of calculation amounts of the whole video coding process. For inter-frame prediction, a calculation amount of motion estimation has a large proportion and approximately takes up 30% to 40% of calculation amounts of the whole video coding process. With the optimization of performance of other parts, the calculation amount of the motion estimation has an increasingly larger proportion. Because how to perform motion estimation in a video coding process directly affects the calculation amounts of the video coding process, a new motion estimation method is urgently needed to reduce the calculation amounts of the motion estimation process, shorten video coding time, and improve video coding efficiency.

To reduce the calculation amounts of the motion estimation process, shorten video coding time, and improve video coding efficiency, an embodiment of the present disclosure provides a motion estimation method. The method may be applied to a motion estimation device. The motion estimation device may be a terminal having a video coding function or a server having a video coding function. Using an example in which the terminal having the video coding function performs this embodiment of the present disclosure, referring to FIG. 2, a method process is provided.

In step 201, for any PU in a to-be-coded image, a terminal constructs a candidate MV list for the PU based on AMVP.

In the video coding process, for any to-be-coded image, the terminal may segment, according to a preset format, the to-be-coded image into at least one macro-block that is independent of each other. Each macro-block forms a PU. The preset format is set by the terminal and may be 4*4, 8*8, or 16*16 pixels. For each PU, the terminal may construct a candidate MV list for the PU, and the candidate MV list includes at least one MV of the current PU, and the at least one MV includes a time-domain motion vector and a space-domain motion vector.

In this embodiment of the present disclosure, when the terminal constructs the candidate MV list for the current PU based on the AMVP, the following sub-steps 2011 to 2017 may be used.

In sub-step 2011, the terminal constructs a space-domain candidate list and a time-domain candidate list based on the AMVP.

The space-domain candidate list includes at least one space-domain motion vector of the current PU. Using FIG. 3(A) as an example, a0, a1, b0, b1, and b2 are macro-blocks in a reference frame. When the space-domain candidate list is constructed based on the AMVP, the terminal first needs to select a candidate macro-block from a0 and a1 and select a candidate macro-block from b0, b1, and b2. A selection sequence for a0 and a1 is a0→a1→scaled a0→scaled a1, and the scaled is a ratio scaling mode. A selection sequence for b0, b1, and b2 is (scaled b0→scaled b1→scaled b2)b0→b1→b2. Then, the terminal obtains a space-domain motion vector corresponding to the candidate macro-block and adds a space-domain candidate vector corresponding to the candidate macro-block into a list, to obtain a space-domain candidate list.

Brackets are used for the foregoing ratio scaling mode because the ratio scaling mode and a common non-ratio scaling mode are alternatives. When the following condition is met: a prediction mode thereof is not intra-frame prediction when a0 and a1 are both reference macro-blocks or exist, the ratio scaling mode is used; otherwise, a common mode is used.

Figures 3A, 3B:
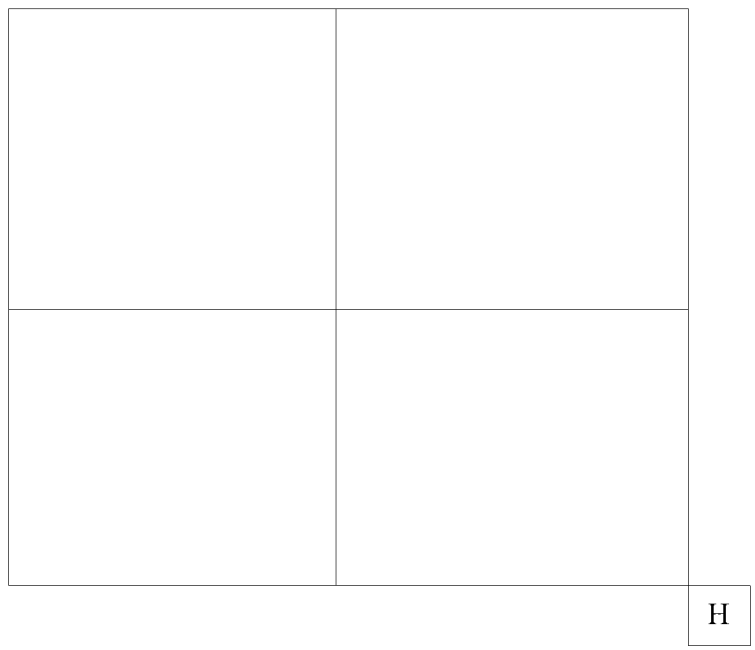
FIG. 3(A) is a schematic diagram of a process of constructing a space-domain motion vector according to an embodiment of the present disclosure.
FIG. 3(B) is a schematic diagram of a process of constructing a time-domain motion vector according to an embodiment of the present disclosure.

The time-domain candidate list includes at least one time-domain motion vector. When the time-domain candidate list is constructed based on the AMVP, selection may be performed according to motion information of a PU at a location at which a macro-block in the reference frame of the coded image (the reference frame of the to-be-coded image) is located. Referring to FIG. 3(B), the location at which the reference macro-block in the reference frame of the coded image is H. if a macro-block at the location H of the reference frame of the to-be-coded image is available, the macro-block at the location H is used as a candidate macro-block, and a time-domain motion vector corresponding to the candidate macro-block is added into a list, to obtain a time-domain candidate list.

In sub-step 2012, the terminal selects a first preset quantity of space-domain motion vectors from the space-domain candidate list.

The first preset quantity is set by the terminal and may be 2, 3, or the like. In this embodiment of the present disclosure, the first preset quantity is 2.

In sub-step 2013, the terminal selects a second preset quantity of time-domain motion vectors from the time-domain candidate list.

The first preset quantity is set by the terminal and may be 1, 2, or the like. In this embodiment of the present disclosure, the first preset quantity is 1.

In sub-step 2014, the terminal constructs a first motion prediction list according to the first preset quantity of space-domain motion vectors and the second preset quantity of time-domain motion vectors.

The terminal adds the first preset quantity of space-domain motion vectors and the second preset quantity of time-domain motion vectors into the same list, to obtain the first motion prediction list.

In sub-step 2015, the terminal merges same motion vectors in the first motion prediction list and performs filling by using a zero motion vector, to obtain a second motion prediction list.

For motion vectors in the first motion prediction list, the terminal may merge the same motion vectors in the first motion prediction list. Specifically, the terminal may merge the same motion vectors in the first preset quantity of space-domain motion vectors in the first motion prediction list and merge the same motion vectors in the second preset quantity of time-domain motion vectors. After the same motion vectors in the first motion prediction list are merged, the quantity of motion vectors in the first motion prediction list is reduced. In this case, filling may be performed by constructing the zero motion vector, to obtain the second motion prediction list.

In sub-step 2016, the terminal selects a third preset quantity of motion vectors from the second motion prediction list.

The third preset quantity may be set by the terminal, and the third preset quantity may be 2, 3, or the like. In this embodiment of the present disclosure, the third preset quantity is 2. To improve calculation precision, when the third preset quantity of motion vectors are selected from the second motion prediction list, it needs to be ensured that the selected third preset quantity of motion vectors also include a time-domain motion vector and a space-domain motion vector.

In sub-step 2017, the terminal constructs the candidate MV list according to the third preset quantity of motion vectors.

The terminal may add the third preset quantity of motion vectors into the same list, to obtain the candidate MV list.

For ease of description, a process for the terminal to construct the candidate MV list is described below by using FIG. 3(C) as an example.

Figure 3C:
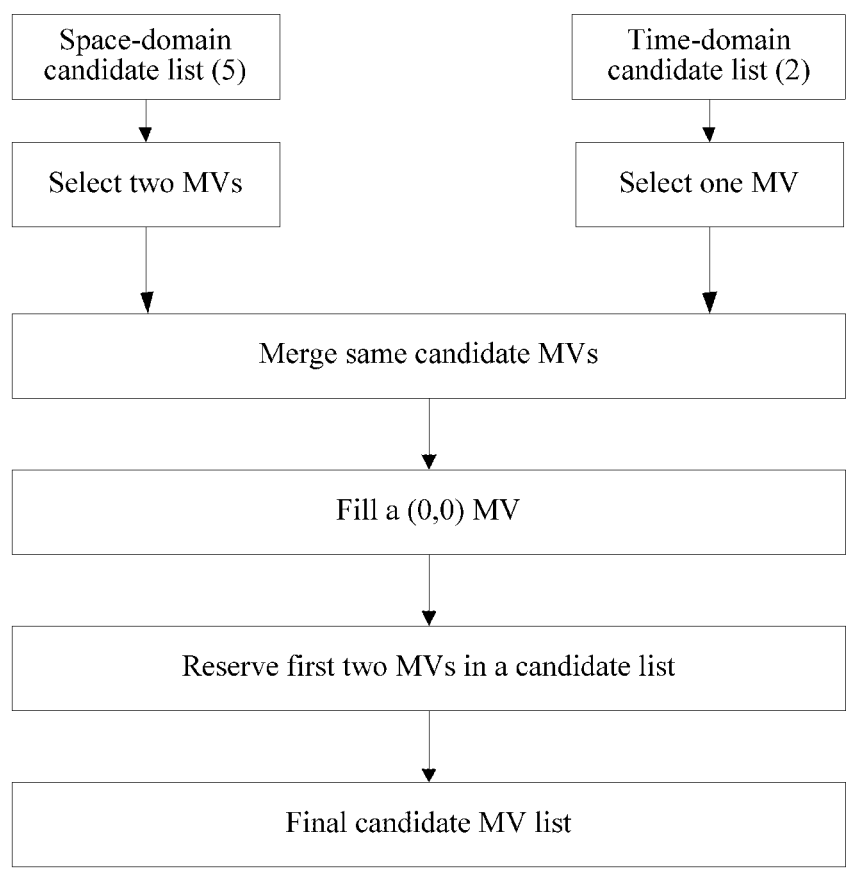
FIG. 3(C) is a schematic diagram of constructing a candidate MV list based on AMVP according to an embodiment of the present disclosure.

Referring to FIG. 3(C), the terminal constructs a space-domain candidate list and a time-domain candidate list based on the AMVP. The space-domain candidate list includes five space-domain motion vectors, and the time-domain candidate list includes two time-domain motion vectors. The terminal selects two space-domain motion vectors from the space-domain candidate list and selects one time-domain motion vector from the time-domain candidate list, merges the selected space-domain motion vectors and time-domain motion vector, and performs filling by using the zero motion vector, to obtain the candidate MV list.

In step 202, the terminal calculates a rate distortion cost of each MV in the candidate MV list and obtains a smallest RD cost value of the AMVP and a target MV of the AMVP from a calculation result.

When the terminal calculates the rate distortion (RD) cost of each MV in the candidate MV list, sum of absolute transformed difference (SATD) may be used to calculate the RD cost of each MV in the candidate MV list, to obtain at least one RD cost value. The SATD refers to performing Hardman transform on a prediction residual block and then obtaining a sum of absolute differences.

When obtaining the target MV of the AMVP and the smallest RD cost value of the AMVP from a calculation result, the terminal may select the smallest RD cost value from the at least one RD cost value, to use the selected RD cost value as the smallest RD cost value of the AMVP and use a MV corresponding to the smallest RD cost value of the AMVP as the target MV of the AMVP. The target MV of the AMVP is actually an optimal MV of an AMVP process.

The smallest RD cost value of the AMVP may be represented by cost_amvp, and cost_amvp has the following functions:

(1) cost_amvp is used for determining whether the HME and the QME need to be performed;

(2) cost_amvp is directly used as cost_best when the HME and the QME do not need to be performed;

(3) after the HME and the QME are performed, whether a calculation result of the QME needs to be corrected is determined.

The target MV of the AMVP may be represented by mv_amvp, and mv_amvp has the following functions:

(1) mv_amvp is used for predicting a motion vector;

(2) mv_amvp is used for determining an initially selected point of the IME;

(3) when the HME and the QME do not need to be performed, mv_amvp may be used as mv_best of motion estimation.

In step 203, the terminal performs IME by using a mapping point of the target MV of the AMVP in a reference frame as an initially selected point and obtains a target MV of the IME from the calculation result. The IME is performed on the PU for example.

The terminal obtains the mapping point of the target MV of the AMVP in the reference frame and performs the IME by using the mapping point as an initially selected point. In an IME process, the terminal may determine a MV according to a location of each movement, to calculate a rate distortion cost of the determined MV, to obtain an RD cost value. After the IME process ends, the terminal obtains the at least one RD cost value, to select the smallest RD cost value from the obtained at least one RD cost value and use a MV corresponding to the smallest RD cost value as the target MV of the IME. The target MV of the IME is actually an optimal MV in the IME process, and the target MV of the IME may be represented by mv_ime.

Because pixel precision corresponding to the AMVP is quarter pixel precision, when the IME is currently performed by using the mapping point of the target MV of the AMVP in the reference frame as the initially selected point, only an integer pixel location is referred to but a fractional pixel location is omitted, such that the determined initially selected point is not accurate. For example, the mapping point of the target MV of the AMVP in the reference frame is (7, 8), and a corresponding integer pixel location is (1, 2). When the IME is currently performed, motion estimation is performed by directly using (1, 2) as the initially selected point, while actually, a mapping point (7, 8) is closer to the location of an integer pixel (2, 2). Therefore, the location of the determined initially selected point of the IME is not accurate.

To improve accuracy of the initially selected point of the IME, in the method provided in this embodiment of the present disclosure, the location of the mapping point of the target MV of the AMVP in the reference frame is corrected (or converted), to perform the IME by using the corrected location as the initially selected point. Considering that the pixel precision of mv_amvp is the quarter pixel precision, the location of the initially selected point may be corrected by combining the location of a fractional pixel, so that the corrected location of the initially selected point is closer to an actual integer pixel location. During specific correction, the following rule may be used: the location of the initially selected point before correction is located in a positive direction of a coordinate axis, and then the location is added by two units (added by 2 on the basis of an original coordinate) and then is moved to the right by two units (equivalent to being divided by 4). If the location of the initially selected point before correction is located in a negative direction of a coordinate axis, two units is deducted from the location (2 is deducted on the basis of an original coordinate), then the location is moved to the right by two units (equivalent to being divided by 4), and finally, rounding is performed, to obtain the corrected integer pixel location. The positive direction and the negative direction are determined by an established coordinate system.

For example, the location of the mapping point of mv_amvp in the reference frame is (7, 8), and a corresponding integer pixel location thereof before correction is (1, 2). Through processing of the foregoing method, a coordinate of an X axis direction after correction is (7+2)/4=2.25, and a coordinate of a Y axis direction after correction is (8+2)/4=2.5. Therefore, the corresponding integer pixel location thereof is (2, 2). For example, the location of the mapping point of mv_amvp in the reference frame is (−7, 8) and a corresponding integer pixel location thereof before correction is (−1, 2). Through processing of the foregoing method, a coordinate of an X axis direction after correction is (−7−2)/4=−2.25, and a coordinate of a Y axis direction after correction is (8+2)/4=2.5. Through approximate processing of rounding, the corresponding integer pixel location thereof may be determined as (−2, 2).

If the terminal already determines the location (0, 0) when calculating the rate distortion cost of each MV in the candidate MV list, the location (0, 0) does not need to be added when the IME is subsequently performed.

In step 204, the terminal amplifies/scales the target MV of the IME to quarter pixel precision, to obtain a reference target MV of QME and determines whether the target MV of the AMVP is the same as the reference target MV of the QME. If yes, perform step 205. If not, perform step 206.

The terminal moves mv_ime to the left by two units (equivalent to being multiplied by 4) based on the obtained target MV of the IME, to obtain the reference target MV of the QME. The reference target MV of the QME is theoretically a target MV obtained by performing the QME. The reference target MV of the QME may be represented by mv_new. The process is denoted as mv_new=mv_ime<<2 units.

The target MV of the AMVP and the reference target MV of the QME are theoretical target MVs corresponding to the QME obtained by using different methods. Therefore, in this embodiment of the present disclosure the terminal compares the target MV of the AMVP with the reference target MV of the QME, to determine whether the HME and the QME need to be performed. When the target MV of the AMVP is the same as the reference target MV of the QME, it is determined that the HME and the QME do not need to be performed, and step 205 is directly performed. When the target MV of the AMVP and the reference target MV of the QME are different, it is determined the HME and the QME need to be performed, and steps 206 to 208 are performed.

In step 205, the terminal determines the target MV of the AMVP and the smallest RD cost value of the AMVP as a final result of a motion estimation process.

When the target MV of the AMVP is the same as the reference target MV of the QME, the terminal does not need to perform the HME and the QME and directly determines the target MV of the AMVP and the smallest RD cost value of the AMVP as the final result of the motion estimation process, that is, mv_amvp=mv_best, and cost_amvp=cost_best.

Because the HME and the QME do not need to be performed, a calculation amount of a motion estimation process is greatly reduced, video coding time is shortened, and video coding efficiency is improved.

In step 206, the terminal performs HME by using a mapping point of the target MV of the IME in the reference frame as an initially selected point and obtains a target MV of the HME from the calculation result.

When the target MV of the AMVP and the reference target MV of the QME are different, to ensure video coding precision, the terminal performs the HME by using the mapping point of the target MV of the IME in the reference frame as the initially selected point. Before the HME is performed, the terminal may perform interpolation according to the integer pixel location in the reference frame, to obtain a half pixel location. Based on the obtained half pixel location and an original integer pixel location, the terminal performs the HME by using the mapping point of the target MV of the IME in the reference frame as the initially selected point. In a movement process using the mapping point of the target MV of the IME in the reference frame as the initially selected point, the terminal determines a MV according to a location of each movement, to calculate a rate distortion cost of the determined MV, to obtain an RD cost value. After an HME process ends, the terminal selects the smallest RD cost value from the obtained RD cost value and uses a MV corresponding to the smallest RD cost value as the target MV of the HME. The target MV of the HME is actually an optimal MV in the HME process, and the target MV of the HME may be represented by mv_hme.

In step 207, the terminal performs QME by using a mapping point of the target MV of the HME in the reference frame as an initially selected point, to obtain a smallest RD cost value of the QME and a target MV of the QME.

Based on the half pixel location and original integer pixel location obtained in step 206, the terminal performs interpolation, to obtain the quarter pixel location. Further based on the obtained quarter pixel location, half pixel location and original integer pixel location, the terminal performs the QME by using the mapping point of the target MV of the HME in the reference frame as the initially selected point. In a movement process using the mapping point of the target MV of the HME in the reference frame as the initially selected point, the terminal determines a MV according to a location of each movement, to calculate a rate distortion cost of the determined MV, to obtain an RD cost value. After a QME process ends, the terminal selects the smallest RD cost value from the obtained RD cost value, the smallest RD cost value is the smallest RD cost value of the QME, and a MV corresponding to the smallest RD cost value of the QME is the target MV of the QME. The smallest RD cost value of the QME may be represented by cost_qme, the target MV of the QME is an optimal MV in the QME process, and the target MV of the QME may be represented by mv_qme.

In step 208, the terminal determines the final result of the motion estimation process according to the smallest RD cost value of the AMVP, the smallest RD cost value of the QME, the target MV of the AMVP, and the target MV of the QME.

Because the smallest RD cost value of the AMVP and the smallest RD cost value of the QME are theoretical rate distortion cost values corresponding to the QME that are obtained by using different methods. The terminal may compare the smallest RD cost value of the AMVP and the smallest RD cost value of the QME, to obtain a high-precision MV on the premise of using a smallest calculation amount as a cost. Specifically, when the terminal determines the final result of the motion estimation process, the following two situations are included but are not limited:

First situation: The terminal determines the target MV of the AMVP and the smallest RD cost value of the AMVP as the final result of the motion estimation process in a case that the smallest RD cost value of the AMVP is less than the smallest RD cost value of the QME.

When the smallest RD cost value of the AMVP is less than the smallest RD cost value of the QME, it indicates that a calculation amount provided when the target MV of the AMVP is obtained by using an AMVP method is the smallest. Therefore, the terminal may determine the smallest RD cost value of the AMVP and the smallest RD cost value of the AMVP as the final result of the motion estimation process, that is, mv_amvp=mv_best, and cost_amvp=cost_best.

Second situation: The terminal determines the target MV of the QME and the smallest RD cost value of the QME as the final result of the motion estimation process in a case that the smallest RD cost value of the AMVP is greater than the smallest RD cost value of the QME.

When the smallest RD cost value of the AMVP is greater than the smallest RD cost value of the QME, it indicates that a calculation amount provided when the target MV of the AMVP is obtained by using an AMVP method is large. Therefore, the terminal may determine the smallest RD cost value of the QME and the smallest RD cost value of the QME as the final result of the motion estimation process, that is, mv_qme=mv_best, and cost_qme=cost_best.

Figure 4:
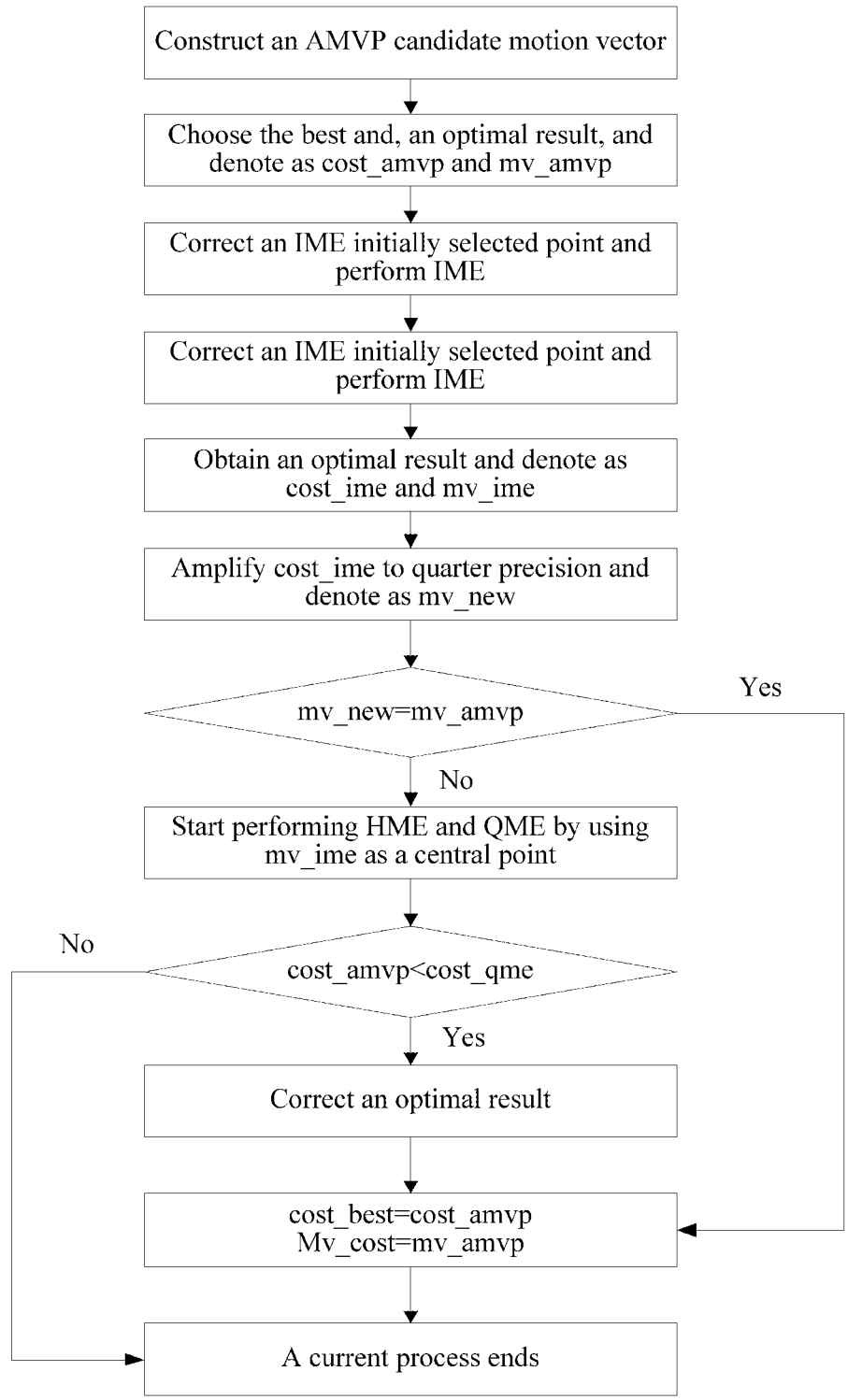
FIG. 4 is a schematic diagram of a motion estimation process according to an embodiment of the present disclosure.

For ease of description, the foregoing whole motion estimation process is described below by using FIG. 4 as an example.

In the video coding process, for any frame of to-be-coded image, the terminal segments the to-be-coded image into at least one PU not overlapping with each other. For any PU, the terminal constructs a candidate MV list for the current PU based on AMVP and calculates a rate distortion cost of each MV in the candidate MV list, to obtain at least one RD cost value. The terminal selects a smallest RD cost value from the at least one RD cost value, uses the smallest RD cost value as a smallest RD cost value of the AMVP, and uses a MV corresponding to the smallest RD cost value as a target MV of the AMVP. In the following, the terminal performs integer motion estimation by using a mapping point of the target MV of the AMVP in a reference frame as an initially selected point and obtaining a target MV of the IME from the calculation result. The terminal amplifies the target MV of the IME to quarter pixel precision, to obtain a reference target MV of QME. When the target MV of the AMVP is the same as the reference target MV of the QME, the terminal does not need to perform the HME and the QME and directly uses the smallest RD cost value of the AMVP and the target MV of the AMVP as a final result of a motion estimation process. When the target MV of the AMVP and the reference target MV of the QME are different, the terminal performs the HME by using a mapping point of the target MV of the IME in the reference frame as an initially selected point and obtains the target MV of the HME from the calculation result. The terminal performs the QME by using a mapping point of the target MV of the HME in the reference frame as an initially selected point, to obtain a smallest RD cost value of the QME and a corresponding target MV thereof from the calculation result. In the following, the terminal compares the smallest RD cost value of the AMVP with the smallest RD cost value of the QME, if the smallest RD cost value of the AMVP is less than the smallest RD cost value of the QME, uses the smallest RD cost value of the AMVP and the target MV of the AMVP as the final result of the motion estimation process, and if the smallest RD cost value of the AMVP is greater than the smallest RD cost value of the QME, uses the smallest RD cost value of the QME and the corresponding target MV as the final result of the motion estimation process.

Figure 5:
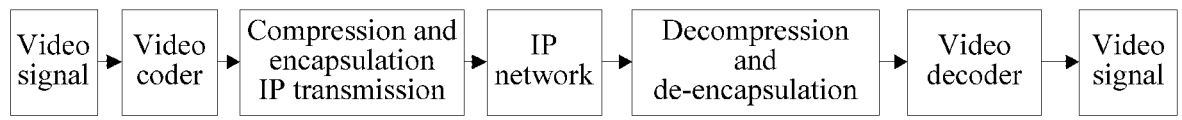
FIG. 5 is a schematic diagram of a video coding process according to an embodiment of the present disclosure.

The motion estimation method provided in this embodiment of the present disclosure may be applied to a video coding process. Referring to FIG. 5, the video coding process includes the following steps:

(1) A transmit end inputs a to-be-coded video signal into a video coder.

The transmit end is the terminal or the server in the embodiments of the present disclosure. The to-be-coded video signal is a digital signal.

(2) The video coder codes the to-be-coded video signal by using frames as a unit, to obtain a plurality of frames of coded images. A specific coding process is:

(a) The video coder codes a first frame of to-be-coded image, to obtain a first frame of coded image (a reference frame).

(b) For a second frame of to-be-coded image, the video coder segments the second frame of to-be-coded image into at least one PU not overlapping with each other.

(c) The video coder performs motion estimation on each PU by using the method provided in the embodiments of the present disclosure, to obtain an optimal MV of each PU, stores the optimal MV of each PU, and determines a prediction image block of each PU in the first frame of coded image according to the optimal MV of each PU.

(d) The video coder obtains a difference between the prediction image block and each PU, to obtain a prediction residual block.

(e) The video coder performs discrete cosine transform and quantization on the prediction residual block, to obtain a quantization coefficient, performs entropy coding on a quantized DCT coefficient, outputs the quantized DCT coefficient, performs inverse quantization and reverse DCT transform on the quantized DCT coefficient, to obtain a residual block of a re-constructed image, adds the re-constructed image and the prediction image block, to obtain a re-constructed image, and obtains the second frame of to-be-coded image after deblocking filter and sample adaptive offset are performed on the re-constructed image. The second frame of to-be-coded image is a reference image for a next frame of to-be-coded image.

(f) The video coder codes other frames of to-be-coded images by cyclically performing steps (c) to (e) until all images are coded.

(3) The coded image is compressed and encapsulated, and a processed image is obtained, and the processed image is sent to a receive end through an IP network.

(4) When receiving the processed image, the receive end decompresses and de-encapsulates the processed image, to obtain a coded image, and inputs the coded image into a video decoder.

(5) The video decoder decodes the coded image, to obtain a video signal, to play the video signal. In a decoding process of the video decoder, the video decoder decodes the first frame of coded image, to obtain a first frame of image, performs image reconstruction according to prediction residual blocks of the first frame of image and a second frame of image and the first frame of image, to obtain the second frame of image, to perform image reconstruction according to prediction residual blocks of the second frame of image and a third frame of image and the second frame of image, to obtain the third frame of image. The rest is deduced by analogy until all images are decoded.

The video coding and decoding method shown in FIG. 5 may be applied to the fields such as home theaters, remote monitoring, digital broadcast, mobile streaming, portable camera shooting, and medical imaging, to meet video viewing requirements of users in different fields.

In the method provided in this embodiment of the present disclosure, the RD cost of each MV in the candidate MV list is calculated, the target MV of the AMVP is obtained, the IME is performed by using the mapping point of the target MV of the AMVP in the reference frame as the initially selected point, the reference target MV of the QME is obtained by amplifying (or converting) the target MV of the IME to the quarter precision, and HME and the QME do not need to be performed but the target MV of the AMVP and the smallest RD cost value of the AMVP are directly used as the final result when the target MV of the AMVP and the reference target MV of the QME are the same, to reduce a calculation amount of calculation of the HME and the QME, shorten duration of a motion estimation process, and save resource consumption.

Figure 6:
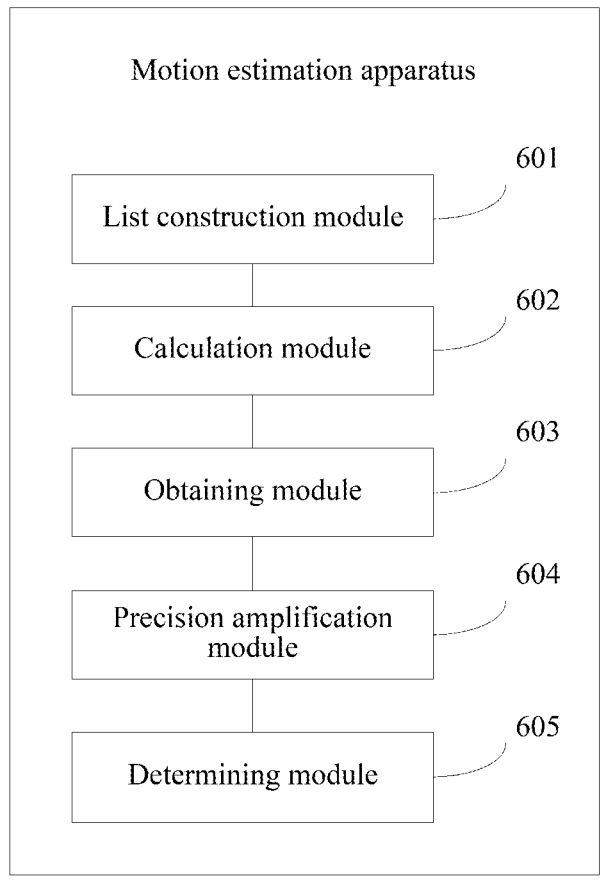
FIG. 6 is a schematic structural diagram of a motion estimation apparatus according to an embodiment of the present disclosure.

Referring to FIG. 6, an embodiment of the present disclosure provides a schematic structural diagram of a motion estimation apparatus. The apparatus includes a list construction module 601, a calculation module 602, an obtaining module 603, a precision amplification module 604, and a determining module 605. One or more of the modules may be implemented by processing circuitry of the motion estimation apparatus. The list construction module 601 is configured to, for any predicting unit PU in a to-be-coded image, construct a candidate motion vector MV list for the PU based on advanced motion vector prediction AMVP, the candidate MV list including at least one MV of the PU. The calculation module 602 is configured to calculate a rate distortion cost RD cost of each MV in the candidate MV list. The obtaining module 603 is configured to obtain a target MV of the AMVP and a smallest RD cost value of the AMVP from a calculation result. The calculation module 602 is configured to perform IME by using a mapping point of the target MV of the AMVP in a reference frame as an initially selected point. The obtaining module 603 is configured to obtain a target MV of the IME from the calculation result. The precision amplification module 604 is configured to amplify the target MV of the IME to quarter pixel precision, to obtain a reference target MV of QME. The determining module 605 is configured to determine the target MV of the AMVP and the smallest RD cost value of the AMVP as a final result of a motion estimation process in a case that the target MV of the AMVP and the reference target MV of the QME are the same. Further, in one embodiment, each target MV is a MV corresponding to a smallest RD cost value of each motion estimation.

In another embodiment of the present disclosure, the calculation module 602 is configured to perform HME by using a mapping point of the target MV of the IME in the reference frame as an initially selected point when the target MV of the AMVP and the reference target MV of the QME are different. The obtaining module 603 is configured to obtain a target MV of the HME from the calculation result. The calculation module 602 is configured to perform QME by using a mapping point of the target MV of the HME in the reference frame as an initially selected point, to obtain a smallest RD cost value of the QME and a target MV of the QME. Further, the determining module 605 is configured to determine the final result of the motion estimation process according to the smallest RD cost value of the AMVP, the smallest RD cost value of the QME, the target MV of the AMVP, and the target MV of the QME.

In another embodiment of the present disclosure, the determining module 605 is configured to determine the target MV of the AMVP and the smallest RD cost value of the AMVP as the final result of the motion estimation process in a case that the smallest RD cost value of the AMVP is less than the smallest RD cost value of the QME; and determine the target MV of the QME and the smallest RD cost value of the QME as the final result of the motion estimation process in a case that the smallest RD cost value of the AMVP is greater than the smallest RD cost value of the QME.

In another embodiment of the present disclosure, the list construction module 601 is configured to construct a space-domain candidate list and a time-domain candidate list based on the AMVP, the space-domain candidate list including at least one space-domain motion vector of the PU, and the time-domain candidate list including at least one time-domain motion vector of the PU; select a first preset quantity of space-domain motion vectors from the space-domain candidate list; select a second preset quantity of time-domain motion vectors from the time-domain candidate list; construct a first motion prediction list according to the first preset quantity of space-domain motion vectors and the second preset quantity of time-domain motion vectors; merge same motion vectors in the first motion prediction list and perform filling by using a zero motion vector, to obtain a second motion prediction list; select a third preset quantity of motion vectors from the second motion prediction list; and construct the candidate MV list according to the third preset quantity of motion vectors.

In another embodiment of the present disclosure, the calculation module 602 is further configured to calculate the RD cost of each MV in the candidate MV list by using sum of absolute transformed difference SATD, to obtain at least one RD cost value. The obtaining module 603 is further configured to select the smallest RD cost value from the at least one RD cost value; and use the selected RD cost value as the smallest RD cost value of the AMVP and use a MV corresponding to the smallest RD cost value of the AMVP as the target MV of the AMVP.

In another embodiment of the present disclosure, the apparatus further includes a location correction module, which may be implemented by circuitry of the apparatus. The location correction module is configured to correct a location of the mapping point of the target MV of the AMVP in the reference frame. The calculation module 602 is configured to perform the IME by using the corrected location as the initially selected point.

That is, in some embodiments, in the apparatus provided in this embodiment of the present disclosure, the RD cost of each MV in the candidate MV list is calculated, the target MV of the AMVP is obtained, the IME is performed by using the mapping point of the target MV of the AMVP in the reference frame as the initially selected point, the reference target MV of the QME is obtained by amplifying the target MV of the IME to the quarter precision, and HME and the QME do not need to be performed but the target MV of the AMVP and the smallest RD cost value of the AMVP are directly used as the final result when the target MV of the AMVP and the reference target MV of the QME are the same, to reduce a calculation amount of calculation of the HME and the QME, shorten duration of a motion estimation process, and save resource consumption.

Figure 7:
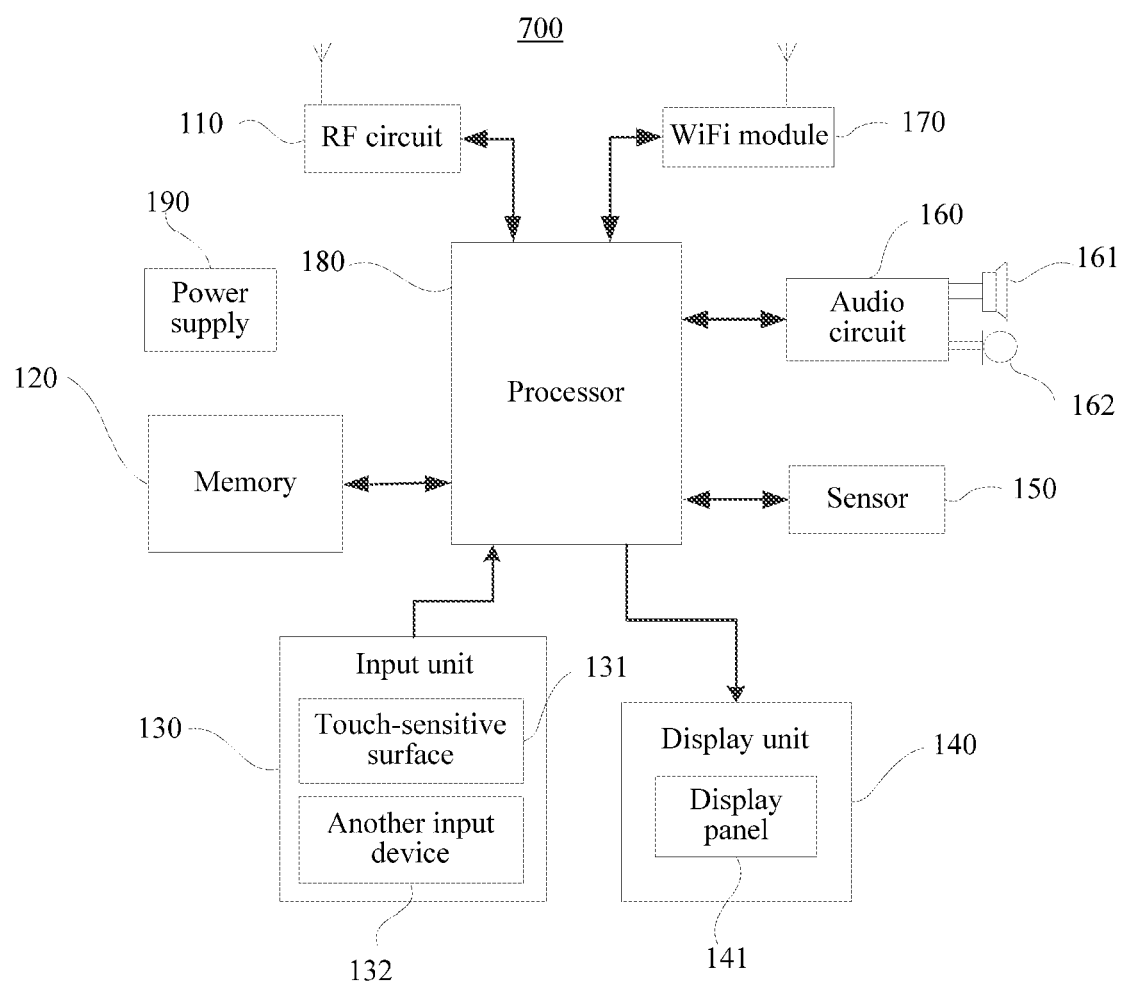
FIG. 7 is a schematic structural diagram of a terminal for motion estimation in an embodiment of the present disclosure.

Referring to FIG. 7, FIG. 7 is a schematic structural diagram of a terminal for motion estimation in an embodiment of the present disclosure. The terminal may be configured to implement the motion estimation method provided in this embodiment of the present disclosure. Specifically, the terminal 700 may include components such as a radio frequency (RF) circuit 110, a memory 120 including one or more computer readable storage mediums, an input unit 130, a display unit 140, a sensor 150, an audio circuit 160, a WiFi module 170, processing circuitry such as a processor 180 including one or more processing cores, and a power supply 190. A person skilled in the art may understand that the structure of the terminal shown in FIG. 7 does not constitute a limitation to the terminal, and the terminal may include more components or fewer components than those shown in the figure, or some components may be combined, or a different component deployment may be used.

The RF circuit 110 may be configured to receive and send signals during an information receiving and sending process or a call process. Particularly, the RF circuit receives downlink information from a base station, then delivers the downlink information to one or more processors 180 for processing, and sends related uplink data to the base station. Generally, the RF circuit 110 includes, but is not limited to, an antenna, at least one amplifier, a tuner, one or more oscillators, a subscriber identity module (SIM) card, a transceiver, a coupler, a low noise amplifier (LNA), and a duplexer. In addition, the RF circuit 110 may also communicate with a network and another device through wireless communication. The wireless communication may use any communications standard or protocol, which includes, but is not limited to, a Global System for Mobile communications (GSM), a general packet radio service (GPRS), Code Division Multiple Access (CDMA), Wideband Code Division Multiple Access (WCDMA), Long Term Evolution (LTE), an email, Short Messaging Service (SMS), and the like.

The memory 120 may be configured to store a software program and module. The processor 180 runs the software program and module stored in the memory 120, to implement various functional applications and data processing. The memory 120 may mainly include a program storage area and a data storage area. The program storage area may store an operating system, an application program required by at least one function (such as a sound playback function and an image display function), and the like. The data storage area may store data (such as audio data and an address book) created according to the use of the terminal 700, and the like. In addition, the memory 120 may include a high-speed random access memory, and may further include a non-volatile memory such as at least one magnetic disk storage device or a flash memory device, or another volatile solid storage device. Correspondingly, the memory 120 may further include a memory controller, to provide access of the processor 180 and the input unit 130 to the memory 120.

The input unit 130 may be configured to receive input digit or character information, and generate a keyboard, mouse, joystick, optical, or track ball signal input related to the user setting and function control. Specifically, the input unit 130 may include a touch-sensitive surface 131 and another input device 132. The touch-sensitive surface 131, which may also be referred to as a touchscreen or a touch panel, may collect a touch operation of a user on or near the touch-sensitive surface (such as an operation of a user on or near the touch-sensitive surface 131 by using any suitable object or accessory, such as a finger or a stylus), and drive a corresponding connection apparatus according to a preset program. Optionally, the touch-sensitive surface 131 may include two parts: a touch detection apparatus and a touch controller. The touch detection apparatus detects a touch position of the user, detects a signal generated by the touch operation, and transfers the signal to the touch controller. The touch controller receives the touch information from the touch detection apparatus, converts the touch information into touch point coordinates, and sends the touch point coordinates to the processor 180. In addition, the touch controller can receive a command sent by the processor 180 and execute the command. In addition, the touch-sensitive surface 131 may be a resistive, capacitive, infrared, or surface sound wave type touch-sensitive surface. In addition to the touch-sensitive surface 131, the input unit 130 may further include the another input device 132. Specifically, the another input device 132 may include, but is not limited to, one or more of a physical keyboard, a functional key (such as a volume control key or a switch key), a track ball, a mouse, and a joystick.

The display unit 140 may be configured to display information input by the user or information provided for the user, and various graphical user interfaces of the terminal 700. These graphical user interfaces may include a graph, text, an icon, a video and any combination thereof. The display unit 140 may include a display panel 141. Optionally, the display panel 141 may be configured by using a liquid crystal display (LCD), an organic light-emitting diode (OLED), or the like. Further, the touch-sensitive surface 131 may cover the display panel 141. After detecting a touch operation on or near the touch-sensitive surface 131, the touch-sensitive surface 131 transfers the touch operation to the processor 180, so as to determine the type of the touch event. Then, the processor 180 provides a corresponding visual output on the display panel 141 according to the type of the touch event. Although, in FIG. 7, the touch-sensitive surface 131 and the display panel 141 are used as two separate parts to implement input and output functions, but in some embodiments, the touch-sensitive surface 131 and the display panel 141 may be integrated to implement the input and output functions.

The terminal 700 may further include at least one sensor 150 such as an optical sensor, a motion sensor, and other sensors. Specifically, the optical sensor may include an ambient light sensor and a proximity sensor. The ambient light sensor may adjust luminance of the display panel 141 according to brightness of the ambient light. The proximity sensor may switch off the display panel 141 and/or backlight when the terminal 700 is moved to the ear. As one type of motion sensor, a gravity acceleration sensor can detect magnitude of accelerations in various directions (generally on three axes), may detect magnitude and a direction of the gravity when static, and may be applied to an application that recognizes the attitude of the mobile phone (for example, switching between landscape orientation and portrait orientation, a related game, and magnetometer attitude calibration), a function related to vibration recognition (such as a pedometer and a knock), and the like. Other sensors, such as a gyroscope, a barometer, a hygrometer, a thermometer, and an infrared sensor, which may be configured in the terminal 700, are not further described herein.

The audio circuit 160, a speaker 161, and a microphone 162 may provide audio interfaces between the user and the terminal 700. The audio circuit 160 may convert received audio data into an electrical signal and transmit the electrical signal to the speaker 161. The speaker 161 converts the electrical signal into a sound signal for output. On the other hand, the microphone 162 converts a collected sound signal into an electrical signal. The audio circuit 160 receives the electrical signal, converts the electrical signal into audio data, and outputs the audio data to the processor 180 for processing. Then, the processor 180 sends the audio data to, for example, another terminal by using the RF circuit 110, or outputs the audio data to the memory 120 for further processing. The audio circuit 160 may further include an earplug jack, to provide communication between a peripheral earphone and the terminal 700.

WiFi belongs to a short distance wireless transmission technology. The terminal 700 may help, through the WiFi module 170, a user to receive and send an e-mail, browse a webpage, and access stream media, and the like, which provides wireless broadband Internet access for the user. Although FIG. 7 shows the WiFi module 170, it may be understood that the WiFi module 170 is not a necessary component of the terminal 700, and the WiFi module 1470 may be omitted as required provided that the scope of the essence of the present disclosure is not changed.

The processor 180 is a control center of the terminal 700, which is connected to various parts of the entire mobile phone by using various interfaces and lines, and by running or executing a software program and/or module stored in the memory 120 and calling data stored in the memory 120, to perform various functions of the terminal 700 and process data, so as to perform overall monitoring on the mobile phone. Optionally, the processor 180 may include one or more processing cores. Optionally, the processor 180 may integrate an application processor and a modem processor. The application processor mainly processes an operating system, a user interface, an application, and the like, and the modem processor mainly processes wireless communication. It may be understood that the foregoing modem processor may alternatively not be integrated into the processor 180.

The terminal 700 further includes the power supply 190 (such as a battery) for supplying power to the components. Preferably, the power supply may be logically connected to the processor 180 by using a power management system, thereby implementing functions such as charging, discharging, and power consumption management by using the power management system. The power supply 190 may further include one or more of a direct current or alternating current power supply, a re-charging system, a power failure detection circuit, a power supply converter or inverter, a power supply state indicator, and any other component.

Although not shown in the figure, the terminal 700 may further include a camera, a Bluetooth module, and the like, which are not further described herein. Specifically, in this embodiment, the display unit of the terminal 700 is a touch screen display, the terminal 700 further includes a memory, the storage medium storing at least one instruction, at least one program, and a code set or an instruction set, and the at least one instruction, the at least one program, and the code set or the instruction set being loaded by the processor to perform the motion estimation method shown in FIG. 2.

In the terminal provided in this embodiment of the present disclosure, the RD cost of each MV in the candidate MV list is calculated, the target MV of the AMVP is obtained, the IME is performed by using the mapping point of the target MV of the AMVP in the reference frame as the initially selected point, the reference target MV of the QME is obtained by amplifying the target MV of the IME to the quarter precision, and HME and the QME do not need to be performed but the target MV of the AMVP and the smallest RD cost value of the AMVP are directly used as the final result when the target MV of the AMVP and the reference target MV of the QME are the same, to reduce a calculation amount of calculation of the HME and the QME, shorten duration of a motion estimation process, and save resource consumption.

Figure 8:
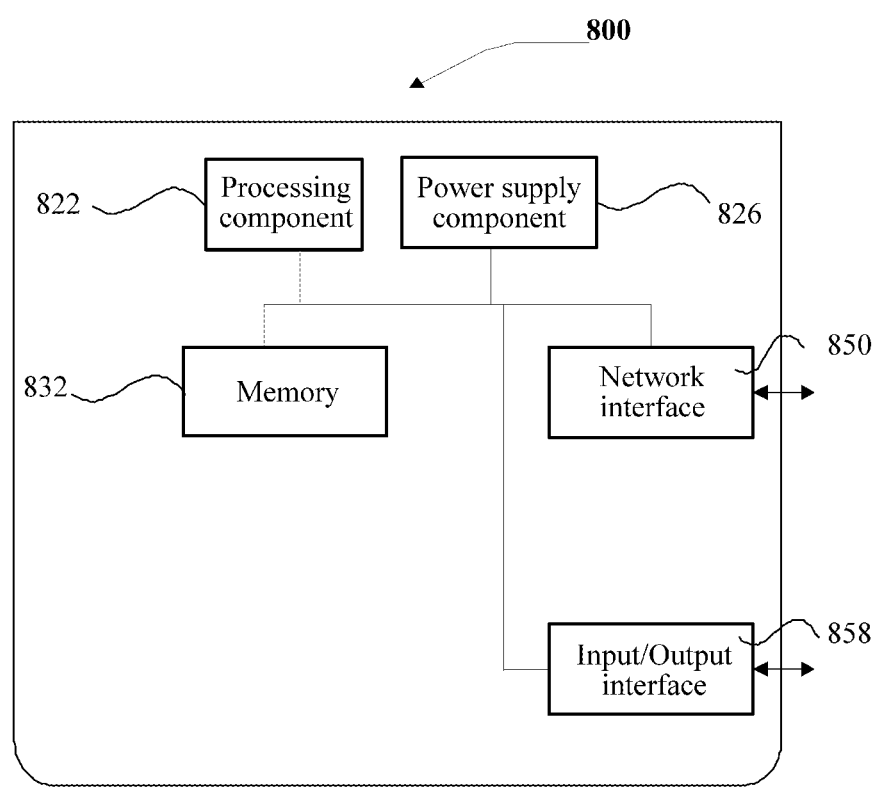
FIG. 8 shows a server for motion estimation shown in an exemplary embodiment.

FIG. 8 shows a server for motion estimation shown in an exemplary embodiment. Referring to FIG. 8, the server 800 includes a processing component 822, and the server 800 further includes processing circuitry such as one or more processors, and a memory resource represented by a memory 832. The memory resource is used for storing an instruction that can be executed by the processing component 822, for example, an application program. The application program stored in the memory 832 may include one or more modules each of which corresponds to a set of instructions. In addition, the processing component 822 is configured as an executable instruction, to execute the motion estimation method shown in FIG. 2.

The server 800 may further include a power supply component 826, configured to perform power supply management of the server 800, a wired or wireless network interface 850, configured to connect the server 800 to a network, and an input/output (I/O) interface 858. The server 800 may operate an operating system that is stored in the memory 832, for example, Windows Server™, Mac OS X™, Unix™, Linux™, or FreeBSD™.

In the server provided in this embodiment of the present disclosure, the RD cost of each MV in the candidate MV list is calculated, the target MV of the AMVP is obtained, the IME is performed by using the mapping point of the target MV of the AMVP in the reference frame as the initially selected point, the reference target MV of the QME is obtained by amplifying the target MV of the IME to the quarter precision, and HME and the QME do not need to be performed but the target MV of the AMVP and the smallest RD cost value of the AMVP are directly used as the final result when the target MV of the AMVP and the reference target MV of the QME are the same, to reduce a calculation amount of calculation of the HME and the QME, shorten duration of a motion estimation process, and save resource consumption.

Figure 2:
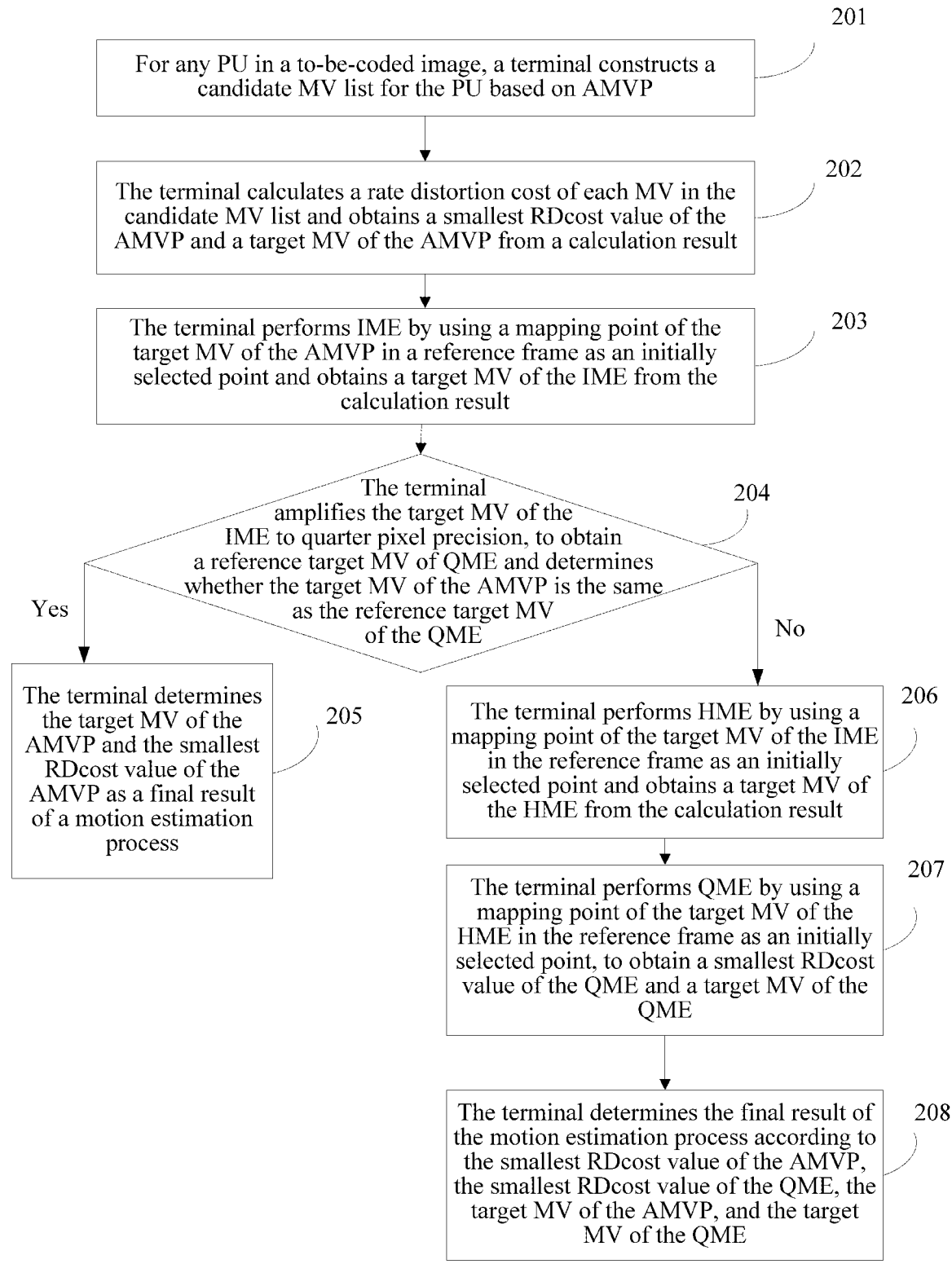
FIG. 2 is a flowchart of a motion estimation method according to an embodiment of the present disclosure.

An embodiment of the present disclosure further provides a computer readable storage medium (e.g., a non-transitory computer-readable storage medium), the storage medium storing at least one instruction, at least one program, and a code set or an instruction set, and the at least one instruction, the at least one program, and the code set or the instruction set being loaded and executed by the processor to implement the motion estimation method shown in FIG. 2.

In the computer readable storage medium provided in this embodiment of the present disclosure, the RD cost of each MV in the candidate MV list is calculated, the target MV of the AMVP is obtained, the IME is performed by using the mapping point of the target MV of the AMVP in the reference frame as the initially selected point, the reference target MV of the QME is obtained by amplifying the target MV of the IME to the quarter precision, and HME and the QME do not need to be performed but the target MV of the AMVP and the smallest RD cost value of the AMVP are directly used as the final result when the target MV of the AMVP and the reference target MV of the QME are the same, to reduce a calculation amount of calculation of the HME and the QME, shorten duration of a motion estimation process, and save resource consumption.

When the motion estimation apparatus and device provided in the foregoing embodiments of the present disclosure perform motion estimation, only divisions of the foregoing functional modules are described by using an example. During actual application, the foregoing functions may be allocated to and completed by different functional modules according to requirements, that is, the internal structures of the motion estimation apparatus and device are divided into different functional modules, to complete all or some of the foregoing described functions. Besides, the motion estimation apparatus and device provided in the foregoing embodiments of the present disclosure and embodiments of the motion estimation method belong to a same concept. Refer to the method embodiments for details of a specific implementation process. Details are not described herein.

A person of ordinary skill in the art may understand that all or some of the steps of the foregoing embodiments of the present disclosure may be implemented by using hardware, or may be implemented by a program instructing relevant hardware. The program may be stored in a computer readable storage medium. The storage medium may be a non-transitory computer-readable storage medium such as a ROM, a magnetic disk, an optical disc, or the like.

The foregoing descriptions are merely exemplary embodiments of the present disclosure, and are not intended to limit the embodiments of the present disclosure. Any modification, equivalent replacement, improvement, or the like made within the spirit and principle of the embodiments of the present disclosure shall fall within the protection scope of the embodiments of the present disclosure.

What is claimed is:

1. A motion estimation method of a motion estimation device, comprising:
    for a predicting unit (PU) in a to-be-coded image, constructing a candidate motion vector (MV) list for the PU based on advanced motion vector prediction (AMVP), the candidate MV list including at least one MV of the PU;
    calculating a rate distortion (RD) cost value of each MV in the candidate MV list;
    obtaining a target MV of the AMVP corresponding to the smallest RD cost value of the AMVP from a result of the calculation;
    performing integer motion estimation (IME) on the PU based on a mapping point of the target MV of the AMVP in a reference frame as an initially selected point;
    obtaining a target MV of the IME from the result of the calculation;
    converting the target MV of the IME to quarter pixel precision, to obtain a reference target MV of quarter motion estimation (QME);
    determining the target MV of the AMVP and the smallest RD cost value of the AMVP as a final result of a motion estimation process in a case that the target MV of the AMVP and the reference target MV of the QME are the same; and
    when the target MV of the AMVP and the reference target MV of the QME are different,
        performing half motion estimation (HME) based on a mapping point of the target MV of the IME in the reference frame as an initially selected point,
        obtaining a target MV of the HME from the result of the calculation,
        performing QME based on a mapping point of the target MV of the HME in the reference frame as an initially selected point, to obtain a smallest RD cost value of the QME and a target MV of the QME, and
        determining the final result of the motion estimation process according to the smallest RD cost value of the AMVP, the smallest RD cost value of the QME, the target MV of the AMVP, and the target MV of the QME.

2. The method according to claim 1, wherein each target MV is a MV corresponding to a smallest RD cost value of each motion estimation.

3. The method according to claim 1, wherein the determining the final result comprises:
    determining the target MV of the AMVP and the smallest RD cost value of the AMVP as the final result of the motion estimation process in a case that the smallest RD cost value of the AMVP is less than the smallest RD cost value of the QME; and
    determining the target MV of the QME and the smallest RD cost value of the QME as the final result of the motion estimation process in a case that the smallest RD cost value of the AMVP is greater than the smallest RD cost value of the QME.

4. The method according to claim 1, wherein the constructing comprises:
    constructing a space-domain candidate list and a time-domain candidate list based on the AMVP, the space-domain candidate list including at least one space-domain motion vector of the PU, and the time-domain candidate list including at least one time-domain motion vector of the PU;

selecting a first preset quantity of space-domain motion vectors from the space-domain candidate list;
selecting a second preset quantity of time-domain motion vectors from the time-domain candidate list;
constructing a first motion prediction list according to the first preset quantity of space-domain motion vectors and the second preset quantity of time-domain motion vectors;
merging same motion vectors in the first motion prediction list and performing filling by using a zero motion vector, to obtain a second motion prediction list;
selecting a third preset quantity of motion vectors from the second motion prediction list; and
constructing the candidate MV list according to the third preset quantity of motion vectors.

5. The method according to claim 1, wherein the calculating comprises:
calculating the RD cost value of each MV in the candidate MV list based on a sum of absolute transformed difference (SATD), to obtain at least one RD cost value; and
the obtaining the target MV of the AMVP includes:
selecting the smallest RD cost value from the at least one RD cost value; and
using the selected RD cost value as the smallest RD cost value of the AMVP and using the MV corresponding to the smallest RD cost value of the AMVP as the target MV of the AMVP.

6. The method according to claim 1, further comprising:
correcting a location of the mapping point of the target MV of the AMVP in the reference frame, wherein
the performing the IME includes performing the IME based on the corrected location as the initially selected point.

7. An information processing apparatus, comprising:
processing circuitry configured to
for a predicting unit (PU) in a to-be-coded image, construct a candidate motion vector (MV) list for the PU based on advanced motion vector prediction (AMVP), the candidate MV list including at least one MV of the PU;
calculate a rate distortion (RD) cost value of each MV in the candidate MV list;
obtain a target MV of the AMVP corresponding to the smallest RD cost value of the AMVP from a result of the calculation;
perform integer motion estimation (IME) on the PU based on a mapping point of the target MV of the AMVP in a reference frame as an initially selected point;
obtain a target MV of the IME from the results of the calculation;
converting the target MV of the IME to quarter pixel precision, to obtain a reference target MV of quarter motion estimation QME;
determine the target MV of the AMVP and the smallest RD cost value of the AMVP as a final result of a motion estimation process in a case that the target MV of the AMVP and the reference target MV of the QME are the same; and
when the target MV of the AMVP and the reference target MV of the QME are different,
perform half motion HME based on a mapping point of the target MV of the IME in the reference frame as an initially selected point,
obtain a target MV of the HME from the result of the calculation,
perform QME based on a mapping point of the target MV of the HME in the reference frame as an initially selected point, to obtain a smallest RD cost value of the QME and a target MV of the QME, and
determine the final result of the motion estimation process according to the smallest RD cost value of the AMVP, the smallest RD cost value of the QME, the target MV of the AMVP, and the target MV of the QME.

8. The information processing apparatus according to claim 7, wherein each target MV is a MV corresponding to a smallest RD cost value of each motion estimation.

9. The information processing apparatus according to claim 7, wherein the processing circuitry is configured to
determine the target MV of the AMVP and the smallest RD cost value of the AMVP as the final result of the motion estimation process in a case that the smallest RD cost value of the AMVP is less than the smallest RD cost value of the QME; and
determine the target MV of the QME and the smallest RD cost value of the QME as the final result of the motion estimation process in a case that the smallest RD cost value of the AMVP is greater than the smallest RD cost value of the QME.

10. The information processing apparatus according to claim 9, wherein the processing circuitry is configured to
construct a space-domain candidate list and a time-domain candidate list based on the AMVP, the space-domain candidate list including at least one space-domain motion vector of the PU, and the time-domain candidate list including at least one time-domain motion vector of the PU;
select a first preset quantity of space-domain motion vectors from the space-domain candidate list;
select a second preset quantity of time-domain motion vectors from the time-domain candidate list;
construct a first motion prediction list according to the first preset quantity of space-domain motion vectors and the second preset quantity of time-domain motion vectors;
merge same motion vectors in the first motion prediction list and perform filling by using a zero motion vector, to obtain a second motion prediction list;
select a third preset quantity of motion vectors from the second motion prediction list; and
construct the candidate MV list according to the third preset quantity of motion vectors.

11. The information processing apparatus according to claim 7, wherein the processing circuitry is further configured to
calculate the RD cost value of each MV in the candidate MV list based on a sum of absolute transformed difference SATD, to obtain at least one RD cost value;
select the smallest RD cost value from the at least one RD cost value; and
use the selected RD cost value as the smallest RD cost value of the AMVP and use the MV corresponding to the smallest RD cost value of the AMVP as the target MV of the AMVP.

12. The information processing apparatus according to claim 7, wherein the processing circuitry is configured to
correct a location of the mapping point of the target MV of the AMVP in the reference frame; and
perform the IME based on the corrected location as the initially selected point.

13. A non-transitory computer readable storage medium, storing instructions which when executed by at least one processor cause the at least one processor to perform:

for a predicting unit (PU) in a to-be-coded image, constructing a candidate motion vector (MV) list for the PU based on advanced motion vector prediction (AMVP), the candidate MV list including at least one MV of the PU;

calculating a rate distortion (RD) cost value of each MV in the candidate MV list;

obtaining a target MV of the AMVP corresponding to the smallest RD cost value of the AMVP from a result of the calculation;

performing integer motion estimation (IME) on the PU based on a mapping point of the target MV of the AMVP in a reference frame as an initially selected point;

obtaining a target MV of the IME from the result of the calculation;

converting the target MV of the IME to quarter pixel precision, to obtain a reference target MV of quarter motion estimation (QME);

determining the target MV of the AMVP and the smallest RD cost value of the AMVP as a final result of a motion estimation process in a case that the target MV of the AMVP and the reference target MV of the QME are the same; and when the target MV of the AMVP and the reference target MV of the QME are different,
performing half motion estimation (HME) based on a mapping point of the target MV of the IME in the reference frame as an initially selected point,
obtaining a target MV of the HME from the result of the calculation,
performing QME based on a mapping point of the target MV of the HME in the reference frame as an initially selected point, to obtain a smallest RD cost value of the QME and a target MV of the QME, and
determining the final result of the motion estimation process according to the smallest RD cost value of the AMVP, the smallest RD cost value of the QME, the target MV of the AMVP, and the target MV of the QME.

14. The non-transitory computer readable storage medium according to claim 13, wherein each target MV is a MV corresponding to a smallest RD cost value of each motion estimation.

15. The non-transitory computer readable storage medium according to claim 13, wherein the determining the final result comprises:

determining the target MV of the AMVP and the smallest RD cost value of the AMVP as the final result of the motion estimation process in a case that the smallest RD cost value of the AMVP is less than the smallest RD cost value of the QME; and determining the target MV of the QME and the smallest RD cost value of the QME as the final result of the motion estimation process in a case that the smallest RD cost value of the AMVP is greater than the smallest RD cost value of the QME.

16. The non-transitory computer readable storage medium according to claim 13, wherein the constructing comprises:

constructing a space-domain candidate list and a time-domain candidate list based on the AMVP, the space-domain candidate list including at least one space-domain motion vector of the PU, and the time-domain candidate list including at least one time-domain motion vector of the PU;

selecting a first preset quantity of space-domain motion vectors from the space-domain candidate list;

selecting a second preset quantity of time-domain motion vectors from the time-domain candidate list;

constructing a first motion prediction list according to the first preset quantity of space-domain motion vectors and the second preset quantity of time-domain motion vectors;

merging same motion vectors in the first motion prediction list and performing filling by using a zero motion vector, to obtain a second motion prediction list;

selecting a third preset quantity of motion vectors from the second motion prediction list; and constructing the candidate MV list according to the third preset quantity of motion vectors.

17. The non-transitory computer readable storage medium according to claim 13, wherein the calculating comprises:

calculating the RD cost value of each MV in the candidate MV list based on a sum of absolute transformed difference (SATD), to obtain at least one RD cost value; and the obtaining the AMVP and the target MV of the AMVP includes:
selecting the smallest RD cost value from the at least one RD cost value, and
using the selected RD cost value as the smallest RD cost value of the AMVP and using the MV corresponding to the smallest RD cost value of the AMVP as the target MV of the AMVP.

* * * * *